United States Patent [19]

Rundzaitis

[11] Patent Number: 4,504,389
[45] Date of Patent: Mar. 12, 1985

[54] WATER FILTER
[75] Inventor: Alfons Rundzaitis, Beverly Shores, Ind.
[73] Assignee: Associated Mills, Inc., Chicago, Ill.
[21] Appl. No.: 458,448
[22] Filed: Jan. 17, 1983
[51] Int. Cl.³ .............................................. B01D 23/26
[52] U.S. Cl. .................................... 210/266; 210/282; 210/424
[58] Field of Search ............... 210/266, 282, 288, 420, 210/421, 424; 137/625.48

[56] References Cited

U.S. PATENT DOCUMENTS

| | | | |
|---|---|---|---|
| D. 242,249 | 11/1976 | Corder | D23/4 |
| 1,912,943 | 6/1933 | Lamela et al. | |
| 1,985,411 | 12/1934 | Houck | 210/87 |
| 2,087,887 | 7/1937 | Gesner | 210/288 |
| 2,334,802 | 11/1943 | Zuckerman | 210/87 |
| 3,184,064 | 5/1965 | Sampson et al. | 210/266 |
| 3,342,335 | 9/1967 | Gamundi et al. | 210/117 |
| 3,382,983 | 5/1968 | Stewart | 210/266 |
| 3,544,457 | 12/1970 | Tulley et al. | 210/290 |
| 3,853,761 | 12/1974 | McLory | 210/100 |
| 4,107,046 | 8/1978 | Corder | 210/282 |
| 4,147,631 | 4/1979 | Deines et al. | 210/137 |
| 4,172,796 | 10/1979 | Corder | 210/282 |
| 4,212,743 | 7/1980 | Van Meter et al. | 210/282 |
| 4,271,015 | 6/1981 | Moore | 210/282 |

FOREIGN PATENT DOCUMENTS

| | | | |
|---|---|---|---|
| 1291371 | 6/1961 | France | 137/625.48 |

OTHER PUBLICATIONS

Ad sheet for "Instapure" cartridge filter sold by Teledyne Industries, Inc., Fort Collins, Colo.
Three Photographs of "Aqua Guard" Faucet Filter, manufactured by U.W.S., West Chicago, Ill., stamped with the indices U.S. Pat. No. 3,853,761.

Primary Examiner—Ivars Cintins
Attorney, Agent, or Firm—Allegretti, Newitt, Witcoff & McAndrews, Ltd.

[57] ABSTRACT

A water filter for use in connection with a replaceable cartridge is disclosed. The cartridge filter has four stages, and a housing for the cartridge filter has a base in which the cartridge filter is mounted on a water-flow-control section extending from the base. The water-flow-control section includes a linearly slidable plunger that directs water either toward or away from the cartridge filter by means of a rotatable lever connected to a slot in the plunger.

9 Claims, 7 Drawing Figures

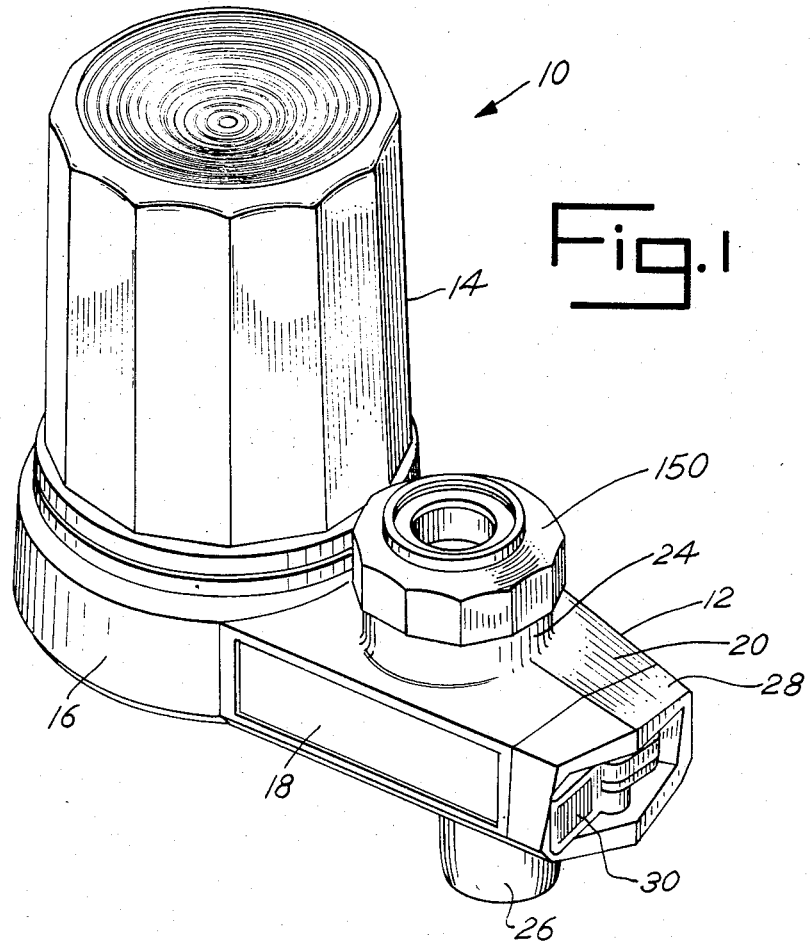
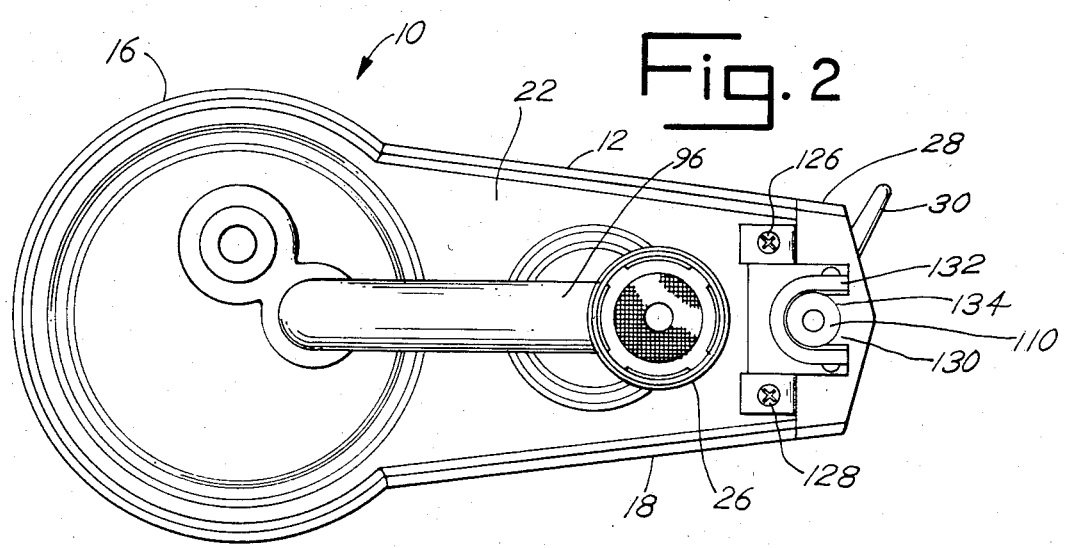

WATER FILTER

BACKGROUND OF THE INVENTION

This invention relates to water filters having removable filter cartridges. More particularly, this invention relates to filters, such as household water filters, that are attachable to faucets and provide the option of providing either filtered or unfiltered water.

Various impurities, such as minerals, trihalomethanes, chlorine, and particulates, often enter domestic tap water to effect the taste, odor, appearance, and healthfulness of the water. In order to remove these impurities, filtration devices can be coupled to household water faucets. Such filtration devices sometimes include a housing and base containing a removable cartridge filter, with the base removably attached to the faucet and having a mechanism that allows the user to selectively obtain either filtered or unfiltered water from the filtration device.

Such devices in the prior art have suffered from several problems. They have often had water-flow switching mechanisms that are costly to manufacture, easily worn out, or difficult to replace when worn out. They have also often been relatively expensive to manufacture, requiring cumbersome or labor intensive production methods, costly or excessive materials, or relatively costly tooling. Further, they have sometimes been aesthetically unattractive for household use.

Equally important, many of the devices in the prior art have cartridge filters that do not filter the water adequately or as much as is desirable. In addition, some cartridge filters in the prior art require the entire water filter apparatus to be disconnected from the water faucet in order to replace the cartridge filter in the apparatus.

SUMMARY OF THE INVENTION

It is therefore an object of the present invention to provide an improved water filter that utilizes a replaceable cartridge filter and is inexpensive to manufacture, requiring less labor-intensive production techniques, less material, and less costly tooling techniques.

It is also an object of the present invention to provide an improved water filter having a water-flow switching mechanism that is easy to manufacture and long lasting.

It is a further object of the present invention to provide a water-flow switching mechanism that is easily replaced and repaired when worn, broken, or clogged.

A further object is to provide a replaceable cartridge filter that filters more adequately and effectively than the cartridge filters of the prior art.

An additional object is to provide a water filter having a cartridge filter that is easily replaceable while a portion of the water filter housing remains attached to the water source.

Another object is to provide a water filter that is aesthetically pleasing to the consumer.

There are other objects and advantages that will become apparent as the specification proceeds. They and the foregoing objects and advantages are accomplished by my invention of an improved water purification apparatus having a housing, a cartridge filter removably mounted in the housing, and a water-flow-control section projecting from the housing. The housing includes a base having a water input channel and a water output channel, and a cap removably secured to the base. The cap and base cooperatively define a filter chamber for the cartridge filter, and the water input and water output channels communicate with a first end in the filter chamber. The cartridge filter receives water from the input channel, filters the water, and returns the water to the output channel. The water-flow-control portion has a water inlet coupling attachable to a water source, a bore communicating with the input channel, a filter bypass passage communicating with the bore, an inlet port communicating with both the water inlet coupling and the bore, an outlet port communicating with both the bore and the filter bypass passage, linearly slidable plunger penetrating the bore, and a switch providing means for controllably sliding the plunger within the bore whereby fluid entering the bore from the inlet port can be selectively directed toward either the cartridge filter or filter bypass passage.

BRIEF DESCRIPTION OF THE DRAWINGS

A preferred embodiment of the present invention is shown in the accompanying drawings wherein:

FIG. 1 is a pictorial view of the preferred embodiment;

FIG. 2 is a bottom plan view of the preferred embodiment revealing the unitary construction of the base of the preferred embodiment;

DETAILED DESCRIPTION OF THE PREFERRED EMBODIMENT

Figure 3:
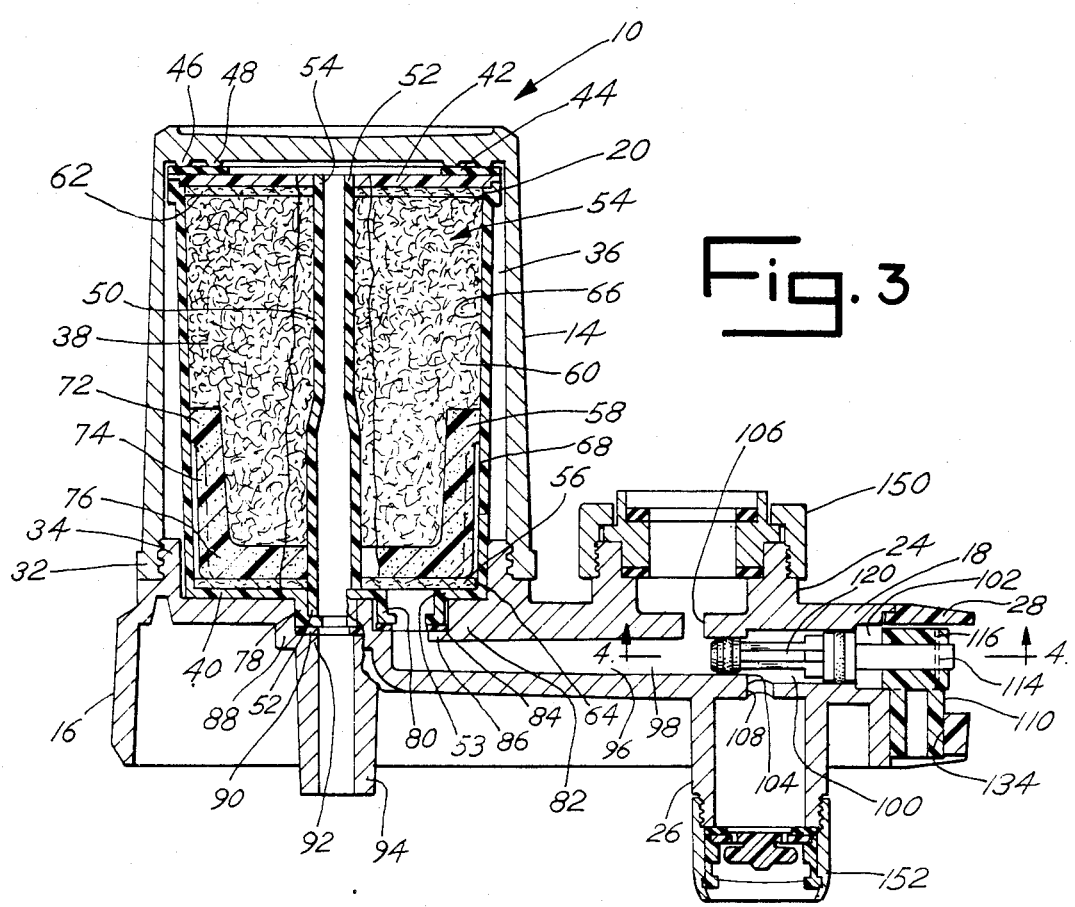
FIG. 3 is a side sectional view of the preferred embodiment revealing in detail the internal structure, water flow paths, catridge filter, and valving within the improved water filter.

With reference to FIG. 1, the preferred embodiment of the improved water filter, generally 10, includes a base 12 and a somewhat tubular cap 14 removably secured to the base 12. The base 12 has a somewhat circular filter mounting section 16 and a water-flow-control section 18 laterally extending from the periphery of the filter mounting section 16. The water-flow-control section 18 has an upper side 20 nearest the cap 14 and, as shown in FIG. 2, a lower side 22 opposite the upper side 20.

With reference back to FIG. 1, a water inlet coupling 24 projects outwardly from the upper side 20 of the water-flow-control section 18, and a filter bypass tube 26 extends outwardly from the lower side 22 of the water-flow-control section 18. On the end of the water-flow-control section 18 opposite the junction of the water-flow-control section 18 with the filter mounting section 16, a water switch frame 28 is removably mounted to the water-flow-control section 18. The frame 28 and water-flow-control section 18 cooperatively retain a rotatable lever 30, which projects outwardly from both the frame 28 and water-flow-control section 18.

With reference to FIG. 3, the cap 14 has a threaded lip section 32 that mates, and thereby interlocks, with a threaded projection section 34 extending from the filter mounting section 16 towards the cap 14. Thus, the cap 14 and filter mounting section 16 cooperatively define the perimeter of an internal chamber 36 within which a removable and replaceable four stage cartridge filter 38 is contained within the improved water filter 10.

The cartridge filter 38 is tubular and has a lower end wall 40 nearest the filter mounting section 16 and an upper end wall 42 opposite the lower end wall 40. The upper end wall 42 sealingly abuts a first annular elastomeric washer seal 44, which in turn sealingly abuts two annular washer contact rings 46 and 48 in the end of the cap 14 nearest the upper end wall 42 of the cartridge filter 38.

A conduit 50 extends from the lower end wall 40 to the upper end wall 42 of the cartridge filter 38. The lower end 52 of the conduit 50 penetrates the lower end wall 40, and the upper end 54 penetrates the upper end wall 42 within the circular area of the upper end wall 42 bounded by the first elastomeric washer seal 44.

A circular water exit passage 52 also penetrates the radial center of the upper end wall 42 within the circular area bounded by the first elastomeric washer seal 44. A water entrance passage 53 penetrates the lower end wall 40 at a point in the lower end wall 40 about midway between the radial center of the lower end wall 40 and outer circumference of the lower end wall 40.

Filtration materials, generally 54, are disposed within the cartridge filter 38 exclusive of the area bounded by the conduit 50. The water entrance passage 53 thus provides a path for water to encounter the filtration materials 54 in the cartridge filter 38, pass through the water exit passage 52, and enter the conduit 50, proceed down the conduit 50.

Figure 6:
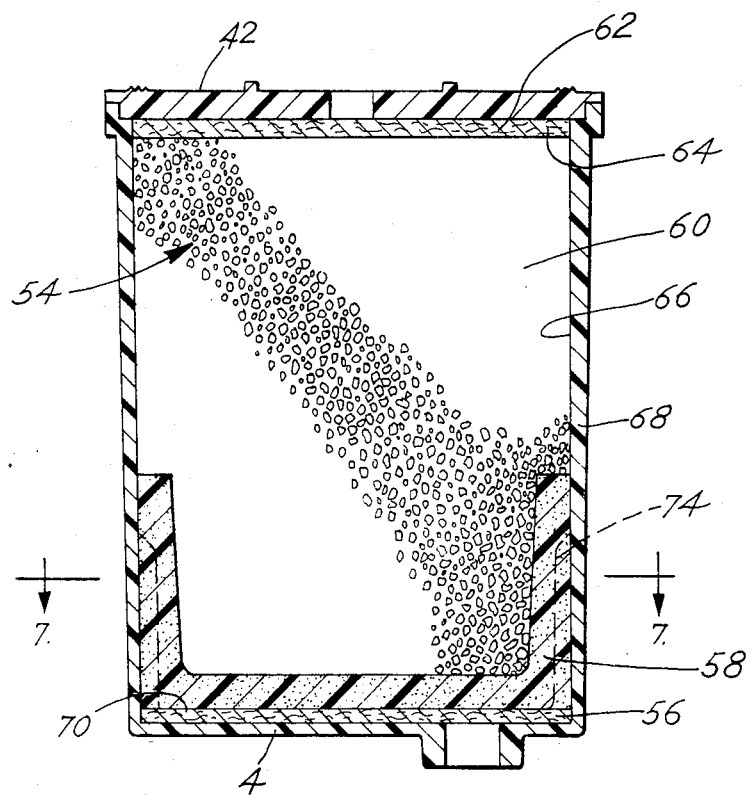
FIG. 6 is a side plan view of the filter cartridge used within the improved water filter.

With reference to FIGS. 3 and 6, there are four stages 56, 58, 60, and 62 of filtration materials 54. The first stage 56 consists of 50-150 (but preferably 120-130, more preferably 125) micron porosity ultrahigh molecular weight polyethylene; the second stage 58 consists of 30-50 (but preferably 30-40, more preferably 35) micron porosity ultrahigh molecular weight polyethylene; the third stage 60 consists of at least 15 (but preferably 35-45, more preferably 40) grams of activated carbon particles, Westvaco type WV-M, mesh 30-50 (but preferably mesh 20×50); and the fourth stage 62 consists of 10-70 (but preferably 15-25, more preferably 20) micron porosity ultrahigh molecular weight polyethylene.

The first stage 56 encountered by the water is disc-shaped, has a first outer circumferential periphery 64 that abuts the inner periphery 66 of the tubular cartridge wall 68, and is 1/16 inch thick. The first stage 56 also abuts the lower end wall 40 of the cartridge filter 38.

The fourth stage 62 is also disc-shaped, also has a second outer circumferential periphery 70 that abuts the inner periphery 66 of the cartridge wall 68, and also is 1/16 inch thick. The fourth stage 62 similarly abuts the upper end wall 42 of the cartridge filter 38.

Figure 7:
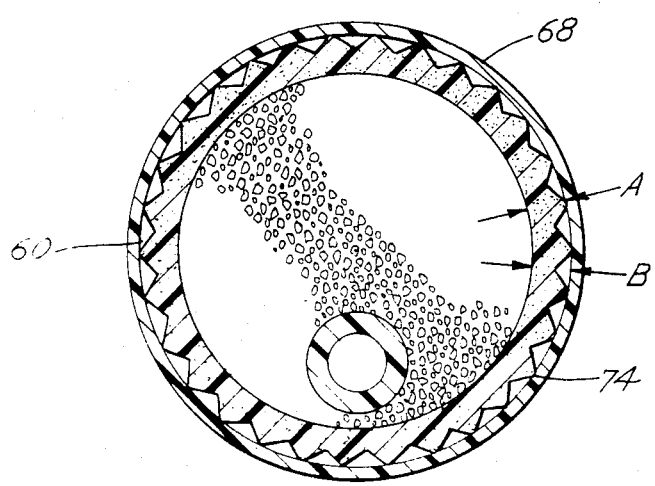
FIG. 7 is a sectional view taken along section line 7—7 of FIG. 6, showing the cross-section of the third stage of the filter cartridge.

The second stage 58 is cup-shaped, has a cup base 76, has an upper outer circumferential lip 72 that abuts the inner periphery 66 of the cartridge wall 68, and has ribbed walls 74 that extend from the lip 72 to the cup base 76. The cup base 76 also abuts the first stage 56 and is ⅛ inch thick. As shown in FIG. 7, the ribbed walls 74 have a uniformly circular inner circumference but have V-shaped ribs in the outer periphery of the ribbed walls 74. The ribbed walls 74 are about ⅛ inch thick at each peak in each rib (dimension A) and are 1/16 inch thick at each valley in each rib (dimension B).

With reference back to FIGS. 3 and 6, the third stage 60 is confined within the area encompassed by the fourth stage 62, the cartridge wall 66, and the second stage 58. In the preferred embodiment, 40 grams of activated carbon granules completely fill this encompassed area.

With reference to FIG. 3, a water outlet boss 78 projects outwardly from the lower end wall 40 of the cartridge filter 38 and communicates with the conduit 50. A water inlet boss 80 also projects outwardly from the lower end wall 40 and communicates with the first stage 56. The water inlet boss 80 slidably penetrates a water input channel 82 in the base 12, and the end of the inlet boss 80 opposite the junction of the inlet boss 80 with lower end wall 40, sealingly abuts a second annular elastomeric washer seal 84, which in turn sealingly abuts a first annular ridge 86 in the input channel 82. Similarly, the water outlet boss 78 slidably penetrates a water output channel 88 in the base 12, and the end of the outlet boss 78 opposite the junction of the outlet boss 78 with lower end wall 40, sealingly abuts a third annular elastomeric washer seal 90, which in turn sealingly abuts a second annular ridge 92 in the output channel 88.

A water output tube 94 extends downwardly from the water output channel 88. A lateral bore 96 communicates at a right angle with the water input channel 82 and laterally extends from the junction of the bore 96 with the input channel 82, through the water-flow-control section 18 to abut the water switch frame 28.

The lateral bore 96 has a tubular water delivery section 98, a tubular filter bypass section 100, and an expanded section 102 having a rectangular cross-section. The water delivery section 98 communicates with the water input channel 82, extending therefrom to communicate with the filter bypass section 100. The diametral width of the water delivery section 98 tapers slightly from the filter bypass section 100 to the water input channel 82, but, at the junction with the filter bypass section 100, the diametral width of the water delivery section 98 is less than the diametral width of the filter bypass section 100, thereby creating an abutment 104 at the junction between the water delivery section 98 and the filter bypass section 100. The expanded section 102 communicates with the end of the filter bypass section 100 opposite the abutment 104.

The water delivery section 98 has a water inlet port 106 in communication with the water inlet coupling 24, and the filter bypass section 100 has a water outlet port 108 in communication with the filter bypass tube 26.

Figure 4:
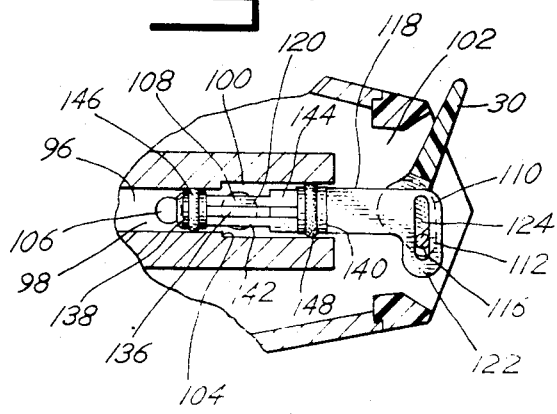
FIG. 4 is a partial sectional view taken along section line 4—4 of FIG. 3, showing the positioning of the plunger within the bore when the water switch is in the position that directs water towards the cartridge filter.
Figure 5:
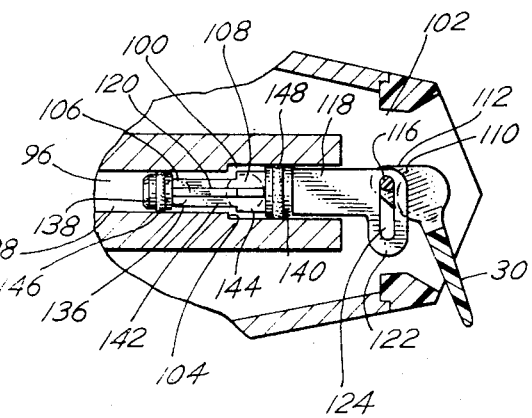
FIG. 5 is a partial sectional view also taken along section line 4—4 of FIG. 3, showing the location of the plunger within the bore when the water switch is in the position that directs water towards the filter bypass passage.

With reference now to FIGS. 4 and 5, the lever 30 extends radially outwardly from a tubular pin 110, which has a radial projection 112 extending radially outwardly from the tubular pin 110 at about 105° from the axis of the lever 30. As best shown in FIG. 3, the tubular pin 110 has a plunger slot 114 fully penetrating the pin 110, and a connector pin 116 penetrates the plunger slot 114 along an axis passing through the radial projection 112 parallel to the axis of the tubular pin 110.

With reference to FIGS. 4 and 5, a plunger 118 slidably penetrates the bore 96. The plunger 118 has a plunging section 120, which slidably penetrates both the water delivery section 98 and the filter bypass section 100 of the bore 96, and a slotted portion 122, which, as shown in FIG. 3, only penetrates the expanded section 102 of the bore 96 and, as shown in FIGS. 4 and 5, adjoins the plunging section 120. The slotted portion 122 has a pin slot 124 transverse to the axis of the bore 96 and perpendicular to the axis of the connector pin 116. A central portion of the connector pin 116 slidably penetrates the pin slot 124 to provide sliding interconnection between the lever 30 and the plunger 120.

With reference now to FIG. 2, the frame 28 is mounted in the water-flow-control section 18 by means of two screws 126 and 128 that penetrate the water-flow-control portion on its lower side 22. The frame 28 has an arcuate seat 130 which aligns with a U-shaped portion 132 on the lower side 22 of the water-flow-control portion 18 to cooperatively define a tubular passage 134, which rotatably retains the tubular pin 110 of the lever 30. Thus, the lever 30 is rotatable around the axis of the tubular pin 110 within the frame 28 such that the axis of rotation of the lever 30 intersects, and is perpendicular to, the axis of the bore 96.

With reference to FIGS. 4 and 5, the rotatable lever 30 and sliding connector pin 116 in the slotted portion 122 of the plunger 118 thus provide a mechanism for translating rotational movement of the lever 30 into linear sliding movement of the plunger 118 in the bore 96. Rotation of the lever 30 between the extreme opposite positions permitted by the frame 28 results in sliding of the plunging section 120 within the water delivery section 98 and the filter bypass section 102. As shown in FIG. 4, when the lever 30 is in the extreme closed position, the plunging section 120 penetrates the bore 96 as much as possible. As shown in FIG. 5, when the lever 30 is in the opposite extreme open position, the plunger section 120 penetrates the bore as little as possible.

The plunging section 120 of the plunger 118 has a ram section 136 on the end of plunging section 120 opposite the junction of the plunging section 120 with the slotted portion 122. The ram section 136 has opposing first 138 and second headers 140 at each end of the ram section 136. Disposed between the first 138 and second headers 140, the ram section 136 has a reduced arm section 142 abutting an enlarged arm section 144, both of which have cross-shaped cross-sections.

The reduced arm section 144 is of such a length that, when the lever 30 is in the closed position as is shown in FIG. 5, the first header 138 and reduced arm section 144 are contained entirely within the water delivery section 98 of the bore 96. When the lever 30 is in the open position as is shown in FIG. 4, the first header 138 is still contained entirely within the water delivery section 98 while the reduced arm section 144 is only partially contained within the water delivery section 98.

The maximum cross-sectional width of the reduced arm section 144 is substantially less than the minimal diametral width of the portion of the water delivery section 98 penetrated by the plunger 118, and the maximum cross-sectional width of the enlarged arm section 142 is substantially less than the minimal diametral width of the filter bypass section 100 of the bore 96.

The first header 138 has a first annular groove (not shown) surrounding the outer periphery of the first header 138 and a first annular seal ring 146 sealingly engaging the first annular groove and slidingly and sealingly engaging the internal wall of the water delivery section 98. The second header 140 has a second annular groove (not shown) surrounding the outer periphery of the second header 140 and a second annular seal ring 148 sealingly engaging the second annular groove and slidingly and sealingly engaging the internal wall of the filter bypass section 100.

As shown in FIGS. 3 and 4, when the lever 30 is in the open position, the first header 138 lies in the filter delivery section 98 between the water inlet opening 106 and the abutment 104 in the bore 96. As shown in FIGS. 3 and 5, when the lever 30 is in the closed position, the first header 138 is between water inlet opening 106 and the water input channel 82. As shown in FIGS. 4 and 5, the second header 140 always lies between the water outlet opening 108 and the expanded section 102 in the bore 96.

With reference to FIG. 3, the water filter, generally 10, is attached to a downwardly directed water faucet (not shown) by means of a faucet coupling 150 mounted on the water inlet coupling 24. When the water filter, generally 10, is used to filter water (not shown), water entering the water inlet coupling 24 passes through the water inlet opening 106 and is directed in one of two directions depending upon the location of the lever 30. When the lever 30 is in the open position as shown in FIG. 4, the first header 138 blocks the passage of water into the filter bypass section 100 and thus forces the water to pass through the water input channel 82, then through the water input boss 80, then into the water entrance passage 52, then sequentially through the four stages of the filtration materials 54, then through the water output channel 88, and finally out the water output tube 94.

In contrast, when the lever 30 is in the closed position as shown in FIG. 5, the first header 138 prevents water from entering the water input channel 82 and instead directs the water around the reduced arm section 144 and enlarged arm section 142 of the plunger 118. The second header 140 prevents water from departing the bore 96 by way of the enlarged section 102 so that water is forced to depart the bore 96 through the water outlet opening 108 and out of the filter 10 by way of the filter bypass tube 26. In order to aerate unfiltered water, an aerator assembly 152 may be mounted at the end of the filter bypass tube 26 opposite the water outlet port 108.

In the preferred embodiment, the cap 14 and the base 12 (minus the frame 28 and lever 30) are comprised of injection molded, chrome plated ABS (acrylonitrite butadiene-styrene). The first washer seal 44, second washer seal 84, third washer seal 90, first seal ring 146, and second seal ring 148 are all comprised of butyl rubber, durometer hardness 50±5. The frame 28 is made from injection molded acetyl resin, Debrin 500, and the lever 30 is made from a strong Lexon 141 polycarbonate.

It should be noted that, in the preferred embodiment, the base, excepting the plunger 118 and frame 28, is a one-piece molded construction and utilizes the minimum amount of materials and parts necessary to manufacture an effective, reliable, and easily repairable water filter 10.

The preferred embodiment described herein provides, among other things, an inexpensive, easily manufactured, durable water filter for near effortless use in the home environment. The water filter has a reliable, easily operable, and easily repairable plunger 118. Indeed the plunger 118 can be quickly and easily repaired by removal of only two screws 126 and 128, which retain the frame 28 and plunger 118 within the water-flow-control section 20. Moreover, the cartridge filter 38 described herein for use in the apparatus described is economical to manufacture yet extremely effective at filtering water in the home environment and can be easily replaced without disconnecting the water filter apparatus from the water faucet.

While in the foregoing, there is set forth a detailed description of only one particular embodiment of the present invention, the preferred embodiment must be considered simply as illustrative. In this regard, the scope of my invention is indicated by the following claims in view of the preceding description, and the claims are intended to embrace all changes that come within their meaning and range of equivalency.

What is claimed is:

1. An improved water purification apparatus comprising, in combination:
    a filter housing having a base and a cap removably secured to said base, said cap and said base cooperatively defining a filter chamber, said base having a water input channel and a water output channel, said water input channel and water output channel communicating with a first end in said filter chamber;
    a cartridge filter removably disposed within said filter chamber, said cartridge filter providing means for receiving water from the water input channel, filtering the water, and returning the water to the water output channel, said receiving, filtering, and returning means including opposed first and second ends on the cartridge filter, a filtration material disposed between said first and second ends, said filtration material having a first stage, a second stage, a third stage, and a fourth stage, said first, second, and fourth stages comprising ultrahigh molecular weight polymer, said third stage comprising activated carbon granules, and said first stage having greater porosity than said second stage;
    a water-flow-control section projecting from the base, said water-flow-control section having a water inlet coupling attachable to a water source, a bore in communication with said water input channel, a filter bypass passage, an inlet port providing means for water communication between said water inlet coupling and said bore, and an outlet port providing means for water communication between said bore and said filter bypass passage;
    a linearly slidable plunger penetrating the bore;
    a water switch providing means for controllably sliding said plunger within said bore whereby water entering the bore from the inlet port can be selectively directed toward either the outlet port or the water input channel.

2. The improved water purification apparatus of claim 1 wherein said water switch includes a frame and a lever rotatably attached to the frame and slidably connected to the plunger to translate rotational movement of the lever into sliding linear movement of the plunger in the bore.

3. The improved water purification apparatus of claim 1 wherein said plunger includes a slotted end portion and said water switch includes a frame and a rotatable lever slidably connected to the slotted portion of the plunger, said frame being removeably mounted to the water-flow-control portion, and said frame and said water-flow-control portion cooperatively providing means for rotatably mounting the lever whereby rotational movement of the lever translates into linear sliding movement of the plunger in the bore.

4. The improved water purification apparatus of claim 1, 2, or 3 wherein the plunger has at least one header for blocking the flow of water within the bore, said header having a groove transverse to the axis of the bore and a slidable, resilient seal ring in the groove whereby the header prevents water from passing around the header within the bore.

5. The improved water purification apparatus of claim 4 wherein said base comprises a unitary section containing at least the water input and output channels, the first end of the filter chamber, the bore, the filter bypass passage, the inlet port, and the outlet port.

6. An improved water purification apparatus comprising, in combination:
    a filter housing having a base and a cap removably secured to said base, said cap and base cooperatively defining a filter chamber, said base having a water input channel and a water output channel, said water input channel and water output channels each communicating with a first end in said filter chamber;
    a removable cartridge filter disposed within said filter chamber, said cartridge filter including opposing first and second end walls, a conduit having opposing first and second ends penetrating said first and second end walls, respectively, a filtration material disposed between said first and second end walls exclusive of said conduit, a water outlet opening in the second end wall, a water inlet opening in the first end wall, said water inlet opening communicating with an outwardly projecting inlet boss slidably penetrating said water output channel, said first end of the conduit communicating with an outwardly projecting outlet boss slidably penetrating said water input channel, said inlet and outlet bosses and input and output channels cooperatively defining means for positioning the filter cartridge in the filter chamber, said input and output channels each providing means for water sealing engagement with the inlet and outlet bosses, respectively, when the cap is secured to the base, said filtration material having a first stage, a second stage, a third stage, and a fourth stage, said first, second, and fourth stages comprising ultrahigh molecular weight polymer, said third stage comprising activated carbon granules, and said first stage having greater porosity than the second stage;
    a water-flow-control portion projecting from the base, said water-flow-control portion having a water inlet coupling attachable to a water source, a bore in communication with the water input channel in the base, a filter bypass passage, an inlet port providing means for water communication between the water inlet coupling and the bore, and an outlet port providing means for water communication between the bore and the filter-bypass passage, said bore having a water delivery section in communication with the water input channel and a filter bypass section having opposed first and second ends, said first end communicating with the water delivery section, and said second end communicating with the outlet port;
    a linearly slidable plunger having a plunging section penetrating the second end of the filter bypass section in the bore, said plunging section having a first sealing header slidably penetrating the water delivery section, a second sealing header slidably penetrating the filter bypass section, and a slotted end portion exclusive of the bore;

a lever;

a water switch frame removably attached to the water-flow-control portion, said frame and water-flow-control portion cooperatively providing means for rotatably mounting the lever to abut the second end of the filter bypass section;

said lever being slidably connected to the slotted end of the plunger whereby rotational movement of the lever translates into linear sliding movement of the plunging section of the plunger in the bore, said water switch frame and lever cooperatively providing switch means for controllably sliding the plunger between a first extreme position and a second extreme position whereby water is alternatively directed from the water source either toward the water outlet channel or the filter bypass passage, said first sealing header being (a) in the bore between the inlet port and filter bypass section when the plunger is in the first extreme position, and (b) in the bore between the inlet port and water input channel when the plunger is in the second extreme position, and said second sealing header being slidable within the bore between the outlet port and the second end of the filter bypass section, said base comprising a unitary section containing at least the water input and output channels, the first end of the filter chamber, the water outlet passage, the bore, the filter bypass passage, and the inlet and outlet ports.

7. An improved water purification apparatus of the type used in connection with a filter housing having a cartridge filter, a base, and cap removably secured to the base, the cap and base cooperatively defining a filter chamber, the cartridge filter being removably mountable in the chamber, the improvement comprising, in combination:

a cartridge filter having a body with opposed first and second ends, a filtration material disposed between said first and second ends, said filtration material having a first stage, a second stage, a third stage, and a fourth stage, said first, second, and fourth stages being comprised of an ultrahigh molecular weight polymer, said third stage being comprised of activated carbon granules, said first stage having greater porosity than the second stage.

8. The improved water purification apparatus of claim 1, 6, or 7 wherein the first stage consists of 120–130 micron porosity polyethylene, the second stage consists of 30–40 micron porosity polyethylene, the third stage consists of 35–45 grams of activated carbon granules, and the fourth stage consists of 15–25 micron porosity polyethylene.

9. The improved water purification apparatus of claim 8 wherein the carbon granules are about 30–50 mesh in size.

* * * * *